(12) United States Patent
Tsuto et al.

(10) Patent No.: US 7,488,837 B2
(45) Date of Patent: Feb. 10, 2009

(54) PROCESS FOR PRODUCING FATTY ACID ALKYL ESTER

(75) Inventors: Keiichi Tsuto, Wakayama (JP); Tetsuya Koshikawa, Kyoto (JP)

(73) Assignee: Revo International Inc., Kyoto (JP)

( * ) Notice: Subject to any disclaimer, the term of this patent is extended or adjusted under 35 U.S.C. 154(b) by 0 days.

(21) Appl. No.: 11/632,171

(22) PCT Filed: Jun. 28, 2005

(86) PCT No.: PCT/JP2005/011829

§ 371 (c)(1),
(2), (4) Date: Jan. 11, 2007

(87) PCT Pub. No.: WO2006/006393

PCT Pub. Date: Jan. 19, 2006

(65) Prior Publication Data

US 2008/0045732 A1   Feb. 21, 2008

(30) Foreign Application Priority Data

Jul. 13, 2004   (JP) .............................. 2004-206487

(51) Int. Cl.
*C11C 3/02*   (2006.01)
*C11B 3/02*   (2006.01)
*C07C 29/06*   (2006.01)

(52) U.S. Cl. .................. 554/169; 554/174; 568/899

(58) Field of Classification Search ................ 560/247; 554/169, 167, 170, 174; 568/835, 898, 899
See application file for complete search history.

(56) References Cited

U.S. PATENT DOCUMENTS 2,381,055 A * 8/1945 Hoyt ........................ 568/870
4,552,702 A * 11/1985 Schmid et al. .............. 554/174
5,166,410 A * 11/1992 Fried .......................... 560/205
5,349,075 A    9/1994 van den Berg et al.
6,712,867 B1 * 3/2004 Boocock ..................... 44/389

FOREIGN PATENT DOCUMENTS

JP   47-13001 B1   4/1972

OTHER PUBLICATIONS

Schuchardt, U. et al., Transesterification of Vegetable Oils: a Review, 1998, Journal of Brazilian Chemical Society, vol. 9, No. 1, pp. 200-202, 207, 208.*
Usmani et al., Porous Ures/Formaldehyde Polymers, Journal of Scientific and Industrial Research, 1980, 39(10), pp. 555 to 562.

* cited by examiner

*Primary Examiner*—Daniel M Sullivan
*Assistant Examiner*—Yate K Cutliff
(74) *Attorney, Agent, or Firm*—Birch, Stewart, Kolasch & Birch, LLP

(57) ABSTRACT

The present invention relates to a process for preparing an alkyl ester of a fatty acid, including the steps of carrying out an esterification reaction between a free fatty acid contained in a fat or oil and an alcohol; carrying out a transesterification reaction between a fat or oil and an alcohol; and refining an alkyl ester of a fatty acid, wherein at least any one of three steps is carried out in a corresponding step selected from the steps of (a) contacting a fat or oil and an alcohol with a resin foamed article to which a catalyst containing fine strongly acidic particles is supported or a resin foamed article modified to be strongly acidic, and carrying out an esterification reaction between a free fatty acid in the fat or oil and the alcohol; (b) contacting a fat or oil and an alcohol with a resin foamed article to which a catalyst containing fine alkali particles is supported, and carrying out a transesterification reaction between the fat or oil and the alcohol; and (c) contacting a reaction mixture obtained by the transesterification reaction with a resin foamed article to remove impurities via adsorption, and refining an alkyl ester of a fatty acid.

9 Claims, No Drawings

PROCESS FOR PRODUCING FATTY ACID ALKYL ESTER

TECHNICAL FIELD

The present invention relates to a process for preparing an alkyl ester of a fatty acid. More specifically, the present invention relates to a process for inexpensively preparing an alkyl ester of a fatty acid through a transesterification reaction of a fat or oil derived from a plant or the like, or a waste edible oil disposed from restaurants, food manufacturing factories, households, and the like utilizing the fat or oil as a raw material with an alcohol.

BACKGROUND ART

Alkyl esters of fatty acids are important as raw materials for fat and oil products, for example, various surfactants and the like, in oleo-chemical industry. Therefore, the preparation process of the alkyl esters of fatty acids is one of the most important processes as upstream processes in the oleo-chemical industry.

On the other hand, since alkyl esters of fatty acids can be used as biomass-derived diesel fuels, the alkyl esters have been remarked as a new energy source for a substitute to petroleum oil.

Generally, an edible oil which has been disposed from restaurants, food manufacturing factories, households, and the like (waste edible oil), is processed by a method such as a waste edible oil is buried in soil after treatment with a coagulation agent, a waste edible oil is disposed as domestic waste, and incinerated. However, in recent years, a trend for an effective reuse of even a waste edible oil has started to be activated with growing awareness of clean global environment. As one of the proposals, there has been tried to start preparing an oil suitable for a diesel fuel by obtaining a methyl ester of a fatty acid through a transesterification reaction with methanol.

Specifically, a methyl ester of a fatty acid from a vegetable oil used as an edible oil is similar to gas oil in terms of properties such as viscosity or specific gravity, and combustion properties. Therefore, potential use of a methyl ester of a fatty acid as a bio-diesel fuel which can be used in engines without remodeling has been pointed out for ages. Recently, a methyl ester of a fatty acid has been in the spotlight as recyclable bio-fuel, and has been widely used, especially in the U.S. and Europe.

In the U.S. and Europe, however, methyl esters of fatty acids derived from fresh edible oil are mainly used, thereby making it more costly than the gas oil. Therefore, the methyl esters of fatty acids are mainly used in a mixed system with a gas oil. Since the edible oil contains a free fatty acid in an amount of about 3% by weight, it is necessary to subject the edible oil to an alkali treatment to remove the free fatty acid in the form of a fatty acid soap, thereby making the edible oil expensive. Alternatively, even when the waste edible oil is used, the waste edible oil undergoes deterioration and usually contains a free fatty acid in an amount of from about 0.5 to about 2% by weight. In any case, it is necessary to solve this disadvantage associated with the free fatty acid in order to use an inexpensive raw material fat or oil. According to a conventional technique, an alkyl ester of a fatty acid is prepared as a fatty acid soap by using a homogeneous alkali catalyst such as NaOH or KOH at the expense of yield and the catalyst, which is one of the causes of high cost (see, for example, Patent Publication 1).

In addition, according to a conventional technique, the homogeneous alkali catalyst is almost entirely contained in a by-product glycerol. Therefore, a tremendously large cost is necessary for the refining of the glycerol in order to make effective use of the glycerol.

The alkyl ester of a fatty acid obtained after the reaction also contains trace amounts of an alkali and glycerol, and an excellent-quality fuel cannot be obtained unless the alkali and glycerol are removed. For this purpose, it is a general practice to wash the alkyl ester with a large amount of water; however, the washing involves complicated procedures and wastewater treatment is also costly.

As described above, in the conventional technique, there are no methods for preparing alkyl esters of fatty acids for diesel fuels using inexpensive raw materials at low processing cost.

Patent Publication 1: JP-A-Hei-6-313188

DISCLOSURE OF INVENTION

Problems to be Solved by the Invention

An object of the present invention is to provide a process for efficiently preparing an inexpensive alkyl ester of a fatty acid by using as a starting material an edible oil such as an inexpensive crude edible oil before removal of free fatty acids or an even less expensive waste edible oil, so that the quality required as a diesel fuel oil can be satisfied, and the processing cost can be consequently reduced by simplification of the preparation processes and reduction in wastes or generation of substantially no wastes, by which the alkyl ester of a fatty acid can be widely used as a substitute fuel for a gas oil. In addition, the provision of the process serves to provide a more reasonable and innovative process as an upstream process in oleo-chemical industry.

Means to Solve the Problems

As the result of intensive studies in order to achieve the above object, the present inventors have found the following three main points: (1) free fatty acids in a fat or oil raw material can be efficiently esterified with an alcohol in a simple pre-treatment reaction, specifically the esterification reaction of free fatty acids can be efficiently achieved by carrying out an esterification reaction using a resin foamed article to which a catalyst containing fine strongly acidic particles is supported, or a resin foamed article modified to be strongly acidic, thereby increasing the specific surface area of an acid catalyst, whereby the reaction efficiency is improved; (2) the reaction efficiency of the transesterification between a fat or oil and an alcohol can be dramatically improved by using a given resin foamed article in which a catalyst containing fine alcohol-insoluble alkali particles which is inherently known to be highly active as a catalyst for transesterification is supported to a given foamed article, thereby increasing the specific surface area of an alkali catalyst, and a refining process can be simplified because the alkali catalyst is not admixed with a reaction product; and (3) hydrophilic impurities such as glycerol contained in a light liquid, such as a crude alkyl ester of a fatty acid, in a trace amount, obtained by removing an excess alcohol after a transesterification reaction and subjecting a heavy liquid layer containing glycerol as a main component to phase separation can be adsorbed and removed with a hydrophilic resin foamed article, and that in the reproduction of the resin foamed article, glycerol or the like adsorbed to the resin foamed article can be washed and removed, i.e. desorbed, with a large amount of an alcohol, and the alcohol collected after this washing can be reused for the reaction. The present invention has been accomplished thereby.

Specifically, the present invention relates to:

[1] a process for preparing an alkyl ester of a fatty acid, including the steps of carrying out an esterification reaction between a free fatty acid contained in a fat or oil and an alcohol; carrying out a transesterification reaction between the fat or oil and an alcohol; and refining an alkyl ester of a fatty acid, wherein at least any one of the three steps is carried out in a corresponding step selected from the steps of:

(a) contacting a fat or oil and an alcohol with a resin foamed article to which a catalyst containing fine strongly acidic particles is supported, or a resin foamed article modified to be strongly acidic, and carrying out an esterification reaction between a free fatty acid in the fat or oil and the alcohol;

(b) contacting a fat or oil and an alcohol with a resin foamed article to which a catalyst containing fine alkali particles is supported, and carrying out a transesterification reaction between the fat or oil and the alcohol; and (c) contacting a reaction mixture obtained by the transesterification reaction with a resin foamed article, thereby adsorbing and removing impurities, and refining an alkyl ester of a fatty acid;

[2] the process according to the above [1], wherein the catalyst in the step (a) contains fine resin particles into which a sulfonic acid group is introduced;

[3] the process according to the above [1] or [2], wherein the fine catalyst particles in the step (a) have an average particle size of from 0.1 to 100 μm;

[4] the process according to any one of the above [1] to [3], wherein the fine catalyst particles in the step (b) contain at least one member selected from the group consisting of hydroxides, oxides, and composite oxides containing an alkaline earth metal and being insoluble in an alcohol; and hydroxides, oxides, composite oxides, and carbonates of an alkali metal fixed to an alcohol-insoluble solid;

[5] the process according to any one of the above [1] to [4], wherein the esterification reaction of the step (a) and/or the transesterification reaction of the step (b) is carried out using the alcohol in a ratio of from 10 to 80 parts by weight based on 100 parts by weight of the fat or oil, and the reaction is carried out at a reaction temperature of 50° to 120° C.;

[6] the process according to any one of the above [1] to [5], further including the step of (d) washing the resin foamed article to which the impurities are adsorbed in the step (c) with an alcohol and using the alcohol after washing, for the esterification reaction in the step (a) and/or the transesterification in the step (b);

[7] the process according to any one of the above [1] to [6], wherein the resin foamed article is a hydrophilic and basic resin foamed article having continuous pores, wherein the resin formed article has a specific gravity of from 0.005 to 0.2;

[8] the process according to any one of the above [1] and [4] to [7], wherein the resin foamed article modified to be strongly acidic in the step (a) contains a cross-linking resin having a sulfonated benzene ring;

[9] the process according to any one of the above [1] to [7], wherein the resin foamed article is a melamine resin foamed article;

[10] the process according to the above [9], wherein the resin foamed article in the step (b) is obtained by allowing the melamine resin foamed article to support the fine catalyst particles via fine organic acidic particles and/or fine inorganic acidic particles; and

[11] the process according to the above [10], wherein the fine catalyst particles in the step (b) have an average particle size of from 0.1 to 10 μm, the fine organic acidic particles have an average particle size of from 0.1 to 100 μm, and the fine inorganic acidic particles have an average particle size of from 10 to 100 nm.

Effects of the Invention

According to the present invention, since a high-quality alkyl ester of a fatty acid for a diesel fuel can be prepared inexpensively, the bio-fuels can be more widely spread, and at the same time the process for preparing an alkyl ester of a fatty acid, which is an upstream process in oleo-chemical industry, can be innovated.

BEST MODE FOR CARRYING OUT THE INVENTION

As described above, the process for preparing an alkyl ester of a fatty acid according to the present invention has the constitution as described above, and realizes the above findings (1) to (3). The point (1) can be accomplished by the step (a), the point (2) can be accomplished by the step (b), and the point (3) can be accomplished by and the step (c) (and the step (d)), respectively.

Specifically, the point (1) enables to handle an inexpensive raw material at low cost. As to the efficiency of the reactions in connection with the points (1) and (2), the reaction system is a liquid-solid phase system, and the overall reaction rate is diffusion rate-determining, not chemical reaction rate-determining. Therefore, it is preferable that the raw material can contact with as many catalyst points as possible. For example, the efficiency of the reaction can be dramatically improved by using fine catalyst particles having an average particle size of several dozens micrometers or less. As the resin foamed article in the present invention, a hydrophilic and basic resin foamed article is preferable, and a melamine resin foamed article which can be prepared economically advantageously is more preferable.

As to the removal of impurities in a crude fatty acid ester in connection with the point (3), since most of impurities are hydrophilic, such as a by-product glycerol, conventionally a method of washing with water has been employed; but there is yet a disadvantage of generation of a large amount of wastewater. In the present invention, a reaction mixture after the transesterification reaction is contacted with a given resin foamed article, and the hydrophilic glycerol or the like is adsorbed and removed. Also in the point (3), it is more preferable that a melamine resin foamed article is used. The main component ester is hydrophobic and hardly likely to be absorbed, but the hydrophilic glycerol or the like can be adsorbed and removed. In the reproduction of the resin foamed article, the absorbed substances can be washed and removed (desorbed) with a large amount of an alcohol, and this alcohol can be reused for the reactions, whereby a process without any wastewater discharged at all from the system can be provided. Especially, the point (3) is important in the preparation of an alkyl ester of a fatty acid for satisfying the quality required of a diesel fuel.

One of the major features of the process of the present invention resides in the use of a given resin foamed article in each of the steps. The resin foamed article in each of the steps may be the same or different from each other. In order to improve the quality of an alkyl ester of a fatty acid, it is especially effective to refine an alkyl ester of a fatty acid according to the step (c).

The process for preparing an alkyl ester of a fatty acid of the present invention includes the steps of carrying out an esterification reaction between a free fatty acid contained in a fat or oil and an alcohol; carrying out a transesterification reaction between a fat or oil and an alcohol; and refining an alkyl ester of a fatty acid, in the same manner as in a conventional process for preparing an alkyl ester of a fatty acid. The steps (a), (b) and (c) of the present invention correspond to the above three steps, respectively. In the present invention, at least any one of the above three steps is carried out in the corresponding step of the step (a), (b), or (c). From the viewpoint of preparing an alkyl ester of a fatty acid having higher quality more inexpensively, it is preferred that the alkyl ester of a fatty acid is prepared by employing a larger number of the above steps (a) to (c).

Procedures, conditions, and the like other than any of the steps (a) to (c) carried out in the process of the present invention are in accordance with a known process for preparing an alkyl ester of a fatty acid, and a reference may be made to, for example, a published book (Tomihiro Kurosaki et al., "Yushikagaku Nyumon (Introduction to Oleo-Chemistry)" published by Sangyo Tosho K. K., 1997).

In the preparation of the alkyl ester of a fatty acid for a diesel fuel or the like, a transesterification reaction between a fat or oil and an alcohol is the main reaction. Specific examples of the fat or oil to be used as a raw material include rapeseed oil, sesame oil, soybean oil, corn oil, sunflower oil, palm oil, palm kernel oil, coconut oil, safflower oil, and the like, which can be used in one kind or as a mixture of two or more kinds. In other words, the fat or oil of the present invention is usually a mixture of triglycerides of a fatty acid having an unsaturated or saturated aliphatic alkyl group having about 8 to about 22 carbon atoms.

It is preferred that the fat or oil raw material suitable for an alkyl ester of a fatty acid for a diesel fuel contains a large amount of triglycerides of fatty acids containing an unsaturated or saturated aliphatic alkyl group having about 10 to about 18 carbon atoms, which is in a liquid state when forming an alkyl ester of a fatty acid. More preferably, a fat or oil raw material suitable for an alkyl ester of a fatty acid for a diesel fuel contains a large amount of triglycerides of fatty acids containing an unsaturated or saturated aliphatic alkyl group having about 12 to about 18 carbon atoms.

For this reason, among these fats or oils to be used as raw materials, one kind or a mixture of two or more kinds selected from the group consisting of rapeseed oil, sesame oil, soybean oil, corn oil, and palm oil are especially preferably used.

In oleo-chemical industry, since animal oils such as beef tallow are also very important, the present invention can also be applied to triglycerides derived from animal oils, as desired.

Conventionally, when a raw material for a vegetable fat or oil is used as an edible oil, the edible oil becomes expensive because free fatty acids previously contained in the fat or oil are removed from the fat or oil by separating a soap generated by neutralization of the free fatty acids with an aqueous alkali solution. On the other hand, in the present invention, an alkyl ester of a fatty acid for a diesel fuel can be efficiently obtained by directly using a vegetable oil or the like containing free fatty acids usually in an amount of 3% by weight or so, thereby making it very economically advantageous.

The raw material fat or oil in the present invention may be a waste edible oil, without being limited to an unused fresh edible oil. It is desired that the waste edible oil is used as a raw material fat or oil, from the viewpoint of economic advantage and social demands. The waste edible oil is deteriorated, and usually contains free fatty acids in an amount of from 0.5 to 2% by weight.

The alcohol to be used for an esterification reaction and a transesterification reaction in the present invention includes, for example, one kind or a mixture of two or more kinds selected from the group consisting of an alkyl alcohol having 1 to 4 carbon atoms such as methyl alcohol (methanol), ethyl alcohol (ethanol), propyl alcohol (propanol), and butyl alcohol (butanol). Although the purity of the alcohol is not particularly limited, an alcohol having a lower water content is more preferable. Among the alkyl alcohol having 1 to 4 carbon atoms, methyl alcohol or ethyl alcohol, and especially methyl alcohol is more preferable for a diesel fuel oil.

The resin foamed article to be used in the present invention is not particularly limited as long as the resin foamed article can contribute to exhibit the desired effects of the present invention. Usually, a hydrophilic and basic resin foamed article having continuous pores, wherein the resin foamed article has a specific gravity of from 0.005 to 0.2 is preferably used from the viewpoint of economic advantage, convenience upon use, and the like. The resin foamed article has a porosity of preferably from 80 to 99.5%. The specific gravity of the resin foamed article is obtained by determining the weight of a resin foamed article having a given volume, for example, a cube of 10 cm each side, and dividing the weight of the resin foamed article obtained by the volume thereof. The porosity of the resin foamed article can be determined by calculating a ratio of a volume occupied by a resin to the volume of the resin foamed article from the found value of the specific gravity of the foamed article and the true specific gravity of the resin. Since the true specific gravity of the resin used in the present invention is usually 1 or so, it is supposed that the true specific gravity of the resin as used herein is 1. The term "continuous pores" refers to continuous pores which are present in the form in which individual pores are fused to each other in one or more locations, not in the form in which the individual pores are completely independent of each other. Specific examples of the resin foamed article used in the present invention will be described later.

[I] Esterification Reaction of Free Fatty Acid in Fat or Oil

In one aspect, the step (a) of the present invention relates to a process for shaping a catalyst for esterification between a free fatty acid in a fat or oil and an alcohol in a high efficiency.

When an inexpensive raw material fat or oil is used, supposing that a free fatty acid in the fat or oil is a raw material for an ester, it is necessary to carry out an esterification reaction to convert the free fatty acid into an ester as a pre-treatment prior to the main reaction, transesterification reaction, from the viewpoint of increasing yield and preventing the generation of a soap by a neutralization reaction of the free fatty acid with a highly-active alkali catalyst used in the transesterification reaction. This free fatty acid is easily esterified with an alcohol in the presence of a homogeneous acid catalyst system.

Conventionally, free fatty acids have been esterified with an alcohol in the presence of an acid catalyst such as sulfuric acid, which has some disadvantages that the acid catalyst is neutralized with an alkali catalyst to be used in the transesterification reaction in the subsequent step, thereby resulting in a loss of the alkali catalyst and formation of salts. In oleo-chemical industry of today, a process using a strongly acidic ion exchange resin as a fixed catalyst is put into practical use. The ion exchange resin catalyst is generally a porous catalyst having fine pores, in which the porous catalyst contains fine particles having an average particle size of from 0.5 to 1 mm. The pore size of the porous catalyst is only as large as several dozens of nanometers. In a liquid phase reaction of a fat or oil, since a nonpolar fat or oil having a large molecular size has a large diffusion resistance, active surfaces of the pores of the porous catalyst do not so much contribute to the reaction, so that the reaction occurs mainly on the outer surface of the porous catalyst which can come into contact with the fat or oil. Therefore, the ion exchange resin catalyst has a smaller active specific surface area, so that there is yet a disadvantage in reaction efficiency. For example, even when a great excess of 10 parts by weight of an alcohol, based on 100 parts by weight of a fat or oil is used for esterifying a free fatty acid, which is usually contained in an amount of about 3% by weight, in the reaction at 65° C., for example, it takes about as long as 90 minutes as a residence time for esterifying about 95% of the free fatty acids by packing a column with an ion exchange resin catalyst, and reacting in a communicating system. The reaction rate is low per unit amount of the catalyst ("Biomass Handbook," p. 138, ed. The Japan Institute of Energy, 2002), so that it is desired that the reaction efficiency is further improved.

In order to increase the active specific surface area of the catalyst, it is considered that the particle size of the catalyst may be made smaller. For example, if the catalyst has an average particle size of from 2 to 20 μm, the specific surface area of the catalyst (as described above, a specific surface area effective for the reaction of a fat or oil being an outer specific surface area) is 25 to 250 times that of the catalyst having an average particle size of 0.5 mm. However, a catalyst tower packed with the small particles cannot be actually operated due to pressure loss or the like, or when the catalyst is used in the form of a suspension, it is difficult to separate the catalyst by filtration or the like after the reaction. In view of the above, in the present invention, an esterification reaction of a free fatty acid is carried out using a resin foamed article to which a catalyst containing fine strongly acidic particles (also referred to as "fine strongly acidic catalyst particles" or "fine catalyst particles" in some cases) is supported, or a resin foamed article modified to be strongly acidic. Here, the term "strongly acidic" means the property as an acid that is capable of substantially completely dissociated in water, which specifically refers to a strong acidity in the neighborhood of the acidity of sulfuric acid.

The catalyst used in the step (a) of the present invention is not particularly limited, as long as the catalyst can catalyze an esterification reaction between a free fatty acid in the fat or oil and an alcohol. As the homogeneous catalyst system to be used for the reaction, sulfuric acid, paratoluenesulfonic acid, benzenesulfonic acid, or the like is generally the most highly efficient catalyst. Therefore, fine organic acidic particles obtained by introducing a strongly acidic sulfonic acid group ($-SO_3H$) or a sulfoethyl group ($-(CH_2)_2SO_2OH$) into fine resin particles composed of a polystyrene-based resin, cellulose, or the like are preferably used. Especially, fine organic acidic particles obtained by introducing a sulfonic acid group into a polystyrene-based resin are preferably used, from the viewpoint of easy formation of fine particles. The polystyrene-based resin refers to a copolymerized resin containing styrene and other monomer such as methyl methacrylate. Especially, a copolymerized resin obtained by cross-linking styrene and divinylbenzene is preferable, and a known resin can be used. The fine organic acidic particle can be obtained by, for example, preparing resin particles by emulsion polymerization, a suspension polymerization method, or other method, and sulfonating the resin particles with hot concentrated sulfuric acid. Alternatively, a convenient method is the use of a pulverized product of commercially available strongly acidic ion exchange resin particles.

As a candidate for the fine strongly acidic particles constituting the catalyst used in the step (a), fine particles composed of a fluorinated sulfonic resin, water-resistant superacid $WO_3/ZrO_2$, or the like can also be recommended. The fine particles can also be used as long as the cost is tolerable.

Although the average particle size of the above fine catalyst particles is not particularly limited, the average particle size of preferably from 0.1 to 100 μm, and more preferably from 0.5 to 50 μm, is appropriate for supporting the fine catalyst particles to a resin foamed article (in other words, the procedures of absorbing and fixing in the present invention), taking into consideration of production cost, an improvement in reaction efficiency due to an increase in specific surface area, and the balance of resistance to fluid flow. It has been known that as the particles become larger, the resistance to fluid flow becomes large, and the binding force of the particles to other substances becomes relatively small ("Shintaikei Kagaku Kogaku "Biryushi Kogaku" (New System of Chemical Engineering "Powder Engineering")," Kikuo Okufiyama et al., p. 174, Ohmsha Ltd., 1992). The disadvantage as described above can be solved by fixing the fine catalyst particles to a resin foamed article by a mechanical action described later.

The average particle size as used herein is obtained as a number-average particle size of a unidirectional diameter using an electron micro graph.

Since the fine catalyst particles used in the step (a) are strongly acidic, it is preferable that a basic resin foamed article is employed for the resin foamed article supporting the fine catalyst particles. The reason therefor is that the catalyst can be supported to the surface of the resin foamed article utilizing an acid-base interaction (Publication: "Wakariyasui Kothingu Gijutsu (Comprehensive Coating Technology)", authored by Yuji Harasaki, p. 20, Riko Publishing Company, 1994: chapter on Bunshikanryokuno Kaisetsu (Explanation on Intermolecular Force)). The term "acid-base interaction" is used for physical binding force such as hydrogen bond or van der Waals force, but not for chemical binding force. In other words, the term "supporting(ed)" refers to adsorbing and fixing to the resin foamed article via the physical binding force as described above.

The basic resin foamed article includes foamed articles composed of an amino resin such as a melamine resin, a urea resin, or a benzoguanamine resin, a nylon, or a polyurethane. Among them, foamed articles composed of a melamine resin, a benzoguanamine resin, a nylon, and a polyurethane are preferable from the viewpoint of excellent heat resistance and chemical resistance. The melamine resin foamed article which is strongly basic and easily prepared or easily available, for example, commercially available products being sold inexpensively as a kitchen abrasive, is especially preferable because the melamine resin foamed article is highly resistant to chemicals and has high mechanical strength.

The melamine resin foamed article has a pore size of from 10 to 1000 μm, in which individual pores are continuous pores having a communicating portions to each other. In addition, in a dry state, the melamine resin foamed article has a specific gravity of from 0.005 to 0.05 and a porosity of from 95 to 99%. When the melamine resin foamed article is compressed, its apparent volume is reduced to a fraction of the volume thereof. By using this feature, when the melamine resin foamed article is immersed in, for example, an aqueous dispersion of fine resin particles under normal pressure, and thereafter dried and compressed, the apparent pore size of the melamine resin foamed article becomes smaller, so that fine particles having a relatively large particle size can be mechanically fixed to the melamine resin foamed article. In other words, fine resin particles having a relatively small particle size are fixed to the melamine resin foamed article by the acid-base interaction described above, and fine resin particles having a relatively large particle size are fixed to the melamine resin foamed article by the mechanical action described above, whereby the fine resin particles having a wide range of particle sizes are supported to the melamine resin foamed article.

The shaping process of a catalyst for economically supporting the above fine catalyst particles to the resin foamed article will be specifically described.

For example, small pieces (for example, spherical or edged pieces having a size of from 5 to 10 mm) of a melamine resin foamed article are added to a suspension of fine sulfonated polystyrene particles having an average particle size of 50 μm or less using water or an alcohol as a solvent, and the fine particles are allowed to penetrate into the melamine resin foamed article while the mixture is stirred for a sufficient period of time. An excess liquid is filtered off, and thereafter the liquid contained in the melamine resin foamed article is mildly dried over a sufficient period of time and removed. This dried melamine resin foamed article is packed into a reactor for carrying out esterification of a raw material fat or oil, while compressing the foamed article.

In the shaping the catalyst in the present invention, supposing that the concentration of particles in the above dispersion of the fine polystyrene particles is 20% by volume and that the melamine resin foamed article after filtration is filled with a liquid having the same particle concentration, the melamine resin foamed article after drying also contains the fine particles in an amount of 20% by volume. If this foamed article is compressed to a volume of ½, the foamed article would be filled with the fine particles having a particle size of 50 μm or less in an amount of 40% by volume per volume of the reactor.

The particles having an average particle size of 500 μm have a catalytic activity, which is referred to a volume efficiency of the reactor, i.e., activity per unit volume of the reactor, of about 4 (=ratio of particle sizes: 10 or more×0.4) times or more, as compared to the case where the particles are directly packed into the reactor, because of the increase in the specific surface area of the catalyst according to a ratio of particle sizes. The catalytic activity does not always correspond to a calculated value because it can be considered that pores somewhat have some influences on the catalytic activity. However, the activity can be expected to be increased several folds.

Therefore, the smaller the average particle size of the fine catalyst particles, the more increased the activity. However, since it is difficult to economically and technologically further make the average particle size of the sulfonated polystyrene particles finer, the average particle size of the fine particles is preferably within the range as defined above.

In the present invention, the resin foamed article to which a catalyst containing fine strongly acidic particles as described above is supported is used for esterification of a free fatty acid. The use of the resin foamed article is based on a technical idea that the shaping of the catalyst is the most important matter for economically preparing an alkyl ester of a fatty acid. In the present invention, the resin foamed article modified to be strongly acidic may also be used aside from the resin foamed article to which fine catalyst particles are supported. In the latter case, the same effects as those of the embodiment where the resin foamed article to which fine catalyst particles are supported can be exhibited.

Specifically, a resin foamed article modified to be strongly acidic refers to a resin foamed article into which a strongly acidic functional group is introduced. The resin foamed article can be prepared by, for example, sulfonating a foamed article composed of a polystyrene-based resin. Taking into consideration the viewpoint of chemical resistance and mechanical strength, the resin foamed article modified to be strongly acidic is preferably composed of a cross-linking resin having a sulfonated benzene ring. The foamed article can be produced by, for example, introducing a sulfonic acid group into a benzene ring contained in the foamed article composed of a phenolic resin or the above benzoguanamine resin.

Taking into consideration comprehensively the viewpoint of chemical resistance, mechanical strength, production cost, or the like, it is preferred that a resin foamed article to which a catalyst containing fine strongly acidic particles is supported is used in the step (a) of the present invention more than a resin foamed article modified to be strongly acidic.

Subsequently, the procedures for carrying out an esterification reaction in the step (a) will be described. The reaction conditions for an esterification reaction of a free fatty acid in the fat or oil with an alcohol in the present invention may be in accordance with conventional reaction conditions. The reaction temperature is preferably 120° C. or less, in consideration of heat resistance of the catalyst or the carrier, but other reaction conditions are not particularly limited. From the viewpoint that in the reaction is carried out at a temperature equal to or less than the boiling point of an alcohol, a reactor is free from legal restrictions imposed on a "pressure vessel," so that operations can be carried out economically, the reaction temperature is preferably from 50° to 120° C. Especially when methanol is used as an alcohol, the reaction temperature is especially preferably from 55° to 64° C.

The ratio of the alcohol to be reacted with the raw material fat or oil is preferably from 10 to 80 parts by weight, more preferably from 13 to 40 parts by weight, based on 100 parts by weight of the fat or oil. The ratio can be set to be the same as that in a transesterification reaction in the next step. In other words, it is advantageous to esterify a free fatty acid in an esterification reaction and thereafter directly subject the product to a transesterification reaction. It is preferable that the transesterification reaction in the next step is continuously operated under the same conditions as the esterification reaction except that the kind of catalyst is changed, i.e., an acid catalyst is changed to an alkali catalyst. Here, even with an acid catalyst, if an acid catalyst having a high catalytic activity is used in a large amount, a transesterification reaction can be progressed. Therefore, the present invention is not intended to exclude an embodiment in which a catalyst is not changed in the esterification reaction and the transesterification reaction.

Generally, the conditions for the esterification reaction in the step (a) are preferably such that an alcohol is used in a ratio of from 10 to 80 parts by weight, based on 100 parts by weight of the fat or oil, and that the reaction temperature is adjusted to from 50° to 120° C.

[II] Transesterification Reaction Between Fat or Oil and Alcohol

In one aspect, the step (b) of the present invention relates to an optimization of the shape of an alkali solid catalyst, thereby raising the reaction efficiency for the transesterification reaction to a high level from a practical viewpoint, and shaping of an alkali solid catalyst economically. In the step (b), the transesterification reaction is carried out in the presence of a catalyst containing fine alkali particles (also referred to as "fine alkali catalyst particles," "fine catalyst particles," or "alkali catalyst" in some cases) supported to the resin foamed article. Specifically, the transesterification reaction progresses between an ester, which is mainly triglycerides, contained in the fat or oil and an alcohol.

At present, in an actually used process in oleo-chemical industry and for a bio-diesel fuel production, the transesterification reaction between a fat or oil (triglycerides) and an alcohol is carried out using an alcohol-soluble alkali catalyst such as NaOH or KOH. The alkali substance is contained in a by-product glycerol layer obtained by phase separation after the reaction. Glycerol per se has an added value as a chemical, and it is desired to refine the glycerol to be used for chemical applications, and the refining is carried out tolerating the fact that its refining cost is expensive. In addition, the desired alkyl ester of a fatty acid contains a trace amount of the alkali substance. From the application of the alkyl ester of a fatty acid as a fuel, it is necessary to remove the alkali substance by employing a method which generates wastewater, such as water after washing. In this wastewater treatment, some costs are involved.

In order to solve the disadvantages in view of the above background, some methods in which a solid catalyst is used have been proposed. Since it has been known that a transesterification reaction also progresses in the presence of an acid catalyst, various inorganic and organic solid acid catalysts have been proposed. However, the activity of each of the acid catalysts is markedly low as compared to that of an alkali catalyst. When the acid catalyst is employed, the cost involved only in the reaction step is equivalent to or higher than the cost involved in a case where washing of esters with water and refining of glycerol are employed, thereby making it economically insignificant, so that the acid solid catalyst has not yet been actually used. On the other hand, two or three proposals on an alkali solid catalyst having a large activity have also been disclosed. However, pellets of an alcohol-insoluble alkaline earth metal oxide and pellets obtained by fixing a hydrophilic alkali metal salt to an insoluble solid carrier are used as the alkali catalyst, which is a liquid phase reaction system of a nonpolar fat or oil, the diffusion resistance of the internal of the pores of the fat or oil is large, so that its catalytic activity is substantially limited, thereby making its activity unsatisfactory for practical purposes.

It is considered that an improvement in the activity of a solid catalyst by a physical method can be achieved by making the particle size smaller and making the specific surface area of the solid catalyst larger. By adjusting the size from pellets usually having a size of about 2 to about 3 mm to particles having a size of from 2 to 3 μm, the specific surface area is increased by 1000 times; therefore, it can be said that the activity is also increased by 1000 times. As described in the esterification reaction, it is assumed that pores of the catalyst have little influence on the activity, so that the activity can be evaluated on the basis of an outer surface area. However, in an actual operation, in a catalyst tower packed with the small particles as mentioned above, the catalyst tower becomes inoperable due to pressure loss or the like, or when the small catalyst particles are used in the form of a suspension, it is difficult to separate the catalyst by filtration or the like after the reaction. In view of the above, in the present invention, a catalyst containing fine alkali particles supported to a given resin foamed article is used. Here, the term "alkali" as used herein means the basicity of a compound containing an alkaline earth metal or an alkali metal.

Since the catalyst containing fine alkali particles is used in the present invention, it is preferred that the resin foamed article is a resin foamed article having an acidic surface because of being able to conveniently support the catalyst to the surface of the resin foamed article. The reason therefor is that the catalyst can be supported by the acid-base interaction as mentioned above.

As the resin foamed article, one composed of a chlorinated resin or the like can be used, but its acid-base interaction is small. Further, one composed of a polymer modified with a carboxyl group, which is strongly acidic, can also be included as a candidate. However, there is a risk that the carboxyl group is reacted with an alcohol during the transesterification reaction to form an ester. A preferred resin foamed article also includes one composed of a fluorinated sulfonic resin, but is not practical from the viewpoint of production cost.

As the resin foamed article to be used in the step (b), various resin foamed articles modified to be strongly acidic mentioned in the above [I] may be used. For example, a resin foamed article obtained by sulfonating a foamed article composed of a polystyrene-based resin can be included. Also in the step (b), it is preferable to use a resin foamed article having excellent high chemical resistance and mechanical strength. From this viewpoint, a resin foamed article composed of a cross-linking resin having a sulfonated benzene ring, for example, a resin foamed article produced by introducing a sulfonic acid group into a benzene ring of a phenolic resin or the above benzoguanamine resin, is preferable. However, these resin foamed articles are also impractical from the viewpoint of production cost.

In view of the above, a "more economical" resin foamed article capable of directly supporting fine alkali catalyst particles is desired. In an embodiment where a resin foamed article is not employed, fine alkali catalyst particles supported to a commercially available strongly acidic ion exchange resin can be employed. However, the commercially available strongly acidic ion exchange resin has a pore size of only several dozens of nanometers. Therefore, when the fine alkali catalyst particles are supported to the commercially available strongly acidic ion exchange resin, the fine alkali catalyst particles are supported only to the outer surface of the ion exchange resin. Therefore, in order to increase the active specific surface area, it is effective from pellets having a size of 2 mm to surfaces of particles having a size of 0.5 mm, showing an increase in efficiency by 4 times or so. In addition, an inorganic acid substance may serve as a candidate in place of a resin foamed article. For example, silica or silica/alumina is a candidate for a carrier. However, the carrier having the same structure as that of a resin foamed article by using the above material is costly to prepare, and is impractical at the present stage from the viewpoint of economic advantage.

In view of the above, in the most preferred embodiment of the present invention, a foamed article in which a catalyst containing fine alkali particles is supported to a melamine resin foamed article, which is preferably used for supporting a catalyst in the esterification reaction previously described, via fine organic acidic particles and/or fine inorganic acidic particles. Specifically, the surface of a melamine resin foamed article is previously coated with fine organic acidic particles and/or fine inorganic acidic particles, whereby the fine alkali catalyst particles are supported to the foamed article by the acid-base interaction described above.

The advantages of adsorbing and fixing fine catalyst particles to a resin foamed article by the acid-base interaction includes the following. Even when fine catalyst particles are crushed when the fat or oil and the alcohol are contacted with the fine catalyst particle to be peeled off from fine acidic particles, the fine catalyst particles can be easily adsorbed and fixed to another fine acidic particle again, so that there is a very low risk of admixture of the fine catalyst particles with a reaction mixture after the transesterification reaction. In addition, there is included an advantage that, for example, an aqueous dispersion of fine catalyst particles is passed through the resin foamed article, so that the catalyst can be replaced with fresh ones, and can be easily reproduced.

The fine organic acidic particles include, for example, fine particles composed of sulfonated polystyrene and fine particles composed of sulfoethylated cellulose, and the fine inorganic acidic particles include, for example, ultrafine silica particles and ultrafine silica/alumina particles.

The surface of a melamine resin foamed article can be coated with fine organic acidic particles and/or fine inorganic acidic particles by physically and/or chemically modifying the surface of the resin foamed article with these fine particles. The physical modification may be carried out in the same manner as in the case where the catalyst containing fine strongly acidic particles is supported to the melamine resin foamed article in the above [I]. On the other hand, in the case where the surface is chemically modified, an appropriate chemical reaction is selected in consideration of the reactivity with a melamine resin depending upon the fine organic acidic particles and/or the fine inorganic acidic particles to be used in the modification, and the reaction may be carried out.

Here, the average particle sizes of the fine alkali catalyst particles, the fine organic acidic particles, and the fine inorganic acidic particles to be used are not particularly limited. The fine alkali catalyst particles have an average particle size of preferably from 0.1 to 10 μm, and more preferably from 0.1 to 3 μm, in consideration of the viewpoint that the smaller the particle size, the higher the catalytic efficiency, and the viewpoint of preparation efficiency, economic advantages, and the like. The fine organic acidic particles have an average particle size of preferably from 0.1 to 100 μm, and more preferably from 0.5 to 50 μm. The inorganic acidic particles have an average particle size of preferably from 10 to 100 nm. When silica is used for the fine inorganic acidic particles, a commercially available silica sol having an average particle size of 10 to 50 nm is preferably used.

Subsequently, a process for economically shaping a catalyst comprising supporting fine alkali catalyst particles to a resin foamed article will be specifically described.

A melamine resin foamed article of which surface is coated with, for example, fine sulfonated polystyrene particles and/or ultrafine silica particles is packed into a column, and thereafter a suspension of fine alkali catalyst particles having an average particle size of, for example, 1 μm in water or methanol which is used as a solvent is passed through the column. The reason why the fine alkali catalyst particles have an average particle size of 1 μm is that the fine alkali catalyst particles can be prepared relatively inexpensively. As the fine alkali catalyst particles are adsorbed to the melamine resin foamed article, a clear liquid is initially observed at the outlet of the column but a turbid liquid begins to be discharged when the adsorption saturation is attained. This point is defined as an end of the adsorption. Next, the melamine resin foamed article is washed with a sufficient amount of water or methanol, and then dried. The amount of the fine alkali catalyst particles supported is determined according to the adsorption area of the foamed article or the particle size of the fine alkali catalyst particles. When the fine alkali catalyst particles have an average particle size of 1 μm, the amount supported falls within the range from about 0.5 to about 10% by volume of the foamed article. Supposing that the foamed article can support the fine alkali catalyst particles in an amount of from 1 to 5% by volume, the active specific surface area of the catalyst is increased by 10 to 50 times (2000 (ratio of particle sizes)×0.01 to 0.05/2 (one-half being the adsorption area)=10 to 50), as compared to that of the pellets having a size of 2 mm. Although not always following the calculation, it can be expected that the activity is increased by 10 times.

The alkali catalyst to be used is not particularly limited, and those containing at least one member selected from the group consisting of hydroxides, oxides, and composite oxides containing an alkaline earth metal and being insoluble in an alcohol, and hydroxides, oxides, composite oxides, and carbonates of an alkali metal fixed to an alcohol-insoluble solid are preferably used. The catalyst includes, for example, an alkaline earth metal compound such as calcium oxide, calcium hydroxide, or calcium titanate; and an alkali metal compound such as sodium hydroxide, potassium hydroxide, sodium tungstate, potassium niobate, sodium carbonate, or potassium carbonate, each fixed to iron oxide, zirconia, zeolite, or the like.

It is needless to say that an alkali catalyst having substantially large activity is preferable, but an alkali catalyst, for example, one known to have a relatively low reaction activity is also applicable. According to a patent publication disclosing an alkali solid catalyst to be used for a transesterification reaction between a fat or oil and an alcohol (JP-2002-294277 A), calcium oxide has a low catalytic activity. However, according to the process for shaping provided by the present invention, a reaction efficiency satisfactory for withstanding industrial applications is obtained. According to the experimental confirmation, it is found that calcium oxide does not adsorb a free fatty acid but esterifies when the free fatty acid has a concentration of 0.2% by weight or less. Therefore, calcium oxide is not deactivated by free fatty acids contained in trace amounts that are generated by the decomposition of esters in the transesterification reaction. In addition, in the present invention, calcium oxide is inexpensive, and can also be used as preferred catalysts.

As mentioned above, it is recommended that the fine alkali catalyst particles have an average particle size of from 0.1 to 10 μm. It is desired that the average particle size is especially from 0.5 to 3 μm, in consideration of production cost, an increase in catalytic activity, and balance of resistance to fluid flow. The average particle size of the fine alkali catalyst particles can be adjusted to a size of submicron to a size of several micrometers or less by pulverizing the fine particles with a pulverizer such as a beads-mill, a ball-mill, or a colloidal mill.

The procedures for a transesterification reaction in the step (b) will be described. In the present invention, reaction conditions for a transesterification reaction between the free fatty acid and an alcohol may be in accordance with those conditions for conventional methods. The reaction temperature is preferably 120° C. or less, in consideration of heat resistance of the catalyst or the carrier to be used, but the other reaction conditions are not particularly limited. In addition, in the reaction carried out at a temperature equal to or less than a boiling point of an alcohol, the reaction temperature is preferably from 50° to 120° C., from the viewpoint that a reactor is free from legal restrictions imposed on a "pressure vessel," and can be operated economically. Especially, when the alcohol is methanol, the reaction temperature is especially preferably from 55° to 64° C.

The alcohol to be reacted with the raw material fat or oil is in a ratio of preferably from 10 to 80 parts by weight, and more preferably from 13 to 40 parts by weight, based on 100 parts by weight of the fat or oil.

Overall, as the conditions for the transesterification reaction in the step (b), it is preferable that the alcohol is used in a ratio of from 10 to 80 parts by weight, based on 100 parts by weight of the fat or oil, and that the reaction temperature is from 50° to 120° C.

[III] Refining of Alkyl Ester of Fatty Acid

The step (c) of the present invention relates to a process for satisfying a quality required of a diesel fuel in the preparation of a diesel fuel oil prepared from a fat or oil such as an edible oil. In addition, according to the present invention, there can be also provided a process by which no wastes are discharged from the preparation process, and this process can be achieved by further carrying out the step (d). It can be said that this process is a process for preparing an alkyl ester of a fatty acid for a diesel fuel, especially a methyl ester of a fatty acid, which is capable of sufficiently reducing production costs and environmental loads.

The phrase "reaction mixture after the transesterification reaction" in the step (c) specifically refers to an upper layer obtained by removing an excess alcohol from a reaction mixture after the transesterification reaction, and thereafter subjecting the reaction mixture to phase separation, in other words, a light liquid crude alkyl ester of a fatty acid. The reaction mixture may be obtained by a conventional method. In the step (c), the alkyl ester of a fatty acid is refined for the following reasons.

In the alkyl ester of a fatty acid, a by-product glycerol and a reaction intermediate such as a monoglyceride or a diglyceride, or an unreacted triglyceride remains. However, when the amount of these substances remaining is large, the quality as a fuel oil cannot be satisfactory, so that it is desired that the amount of these substances is made as small as possible. The unreacted substance and the reaction intermediate can be reduced to a level that would not pose any disadvantages by increasing the reaction efficiency of the transesterification reaction between a fat or oil and an alcohol. As for glycerol, the disadvantage is of a more serious issue because removal must be carried out.

For example, in the system containing a methyl ester of a fatty acid alone, there is a possibility that a hydrophilic glycerol which is previously solubilized in an oil, such as a methyl ester of a fatty acid, with an amphiphilic substance such as a monoglyceride or a diglyceride is separated from the oil and precipitated due to environmental changes such as storage time and temperature. On the other hand, in a mixed system with a gas oil, a monoglyceride or a diglyceride is also dissolved in the gas oil, so that the degree of solubilization of glycerol in the mixture is lowered, thereby increasing a possibility of separation and precipitation of glycerol. If such a phenomenon takes place during storage or in a fuel pipe of automobiles, various troubles can be caused, thereby making it unsuitable as a diesel fuel. As a matter of course, it is needless to say that it is necessary to reduce the remaining amounts of methanol and water as much as possible.

For the reasons as mentioned above, in Europe and the U.S., the quality standards for a methyl ester of a fatty acid for diesel fuel oil have been studied of necessity. Currently, Europe has enacted European (EU) universal standards, in which glycerol content is required to be 0.02% by weight or less. Similarly in the U.S. (ASTM PS-121-99), it is now legally provided that a glycerol content is 0.02% by weight or less. On the other hand, currently in Japan, there is a movement to set standards for a methyl ester of a fatty acid for use in a fuel, and discussions are now being held in reference to the European standards so as not to cause troubles in moving automobiles.

From the viewpoint as described above, a refining method especially for the purpose of reduction in a glycerol content is earnestly desired.

Conventionally, a process for preparing an alkyl ester of a fatty acid from a fat or oil raw material has been known. For example, there is a process including the steps of reacting a fat or oil (a fatty acid triglyceride) and an alcohol in the presence of an acid or alkali catalyst to give an alkyl ester of a fatty acid; and washing with water to remove the acid or alkali catalyst and other water-soluble substances, thereby refining the resulting product. However, according to the process, a liquid mixture is likely to be emulsified by washing with water, so that it is necessary to allow the liquid mixture to stand a whole day and night to separate away added water.

As an improved refining process which involves washing with water, a method of achieving avoidance of emulsification and acceleration of phase separation by adding washing water to a reaction mixture after the transesterification reaction, and heating the obtained mixture to 70° to 90° C. as essential conditions (JP-A-Hei-7-310090). It is to be noted that there is a condition that a component of an alkali used for the reaction dissolved in a methyl ester of a fatty acid is neutralized with an acid for the purpose of avoiding hydrolysis of the methyl ester of a fatty acid generated by a high-temperature treatment. In this process, washing effect is attained by repeating twice the procedures of adding 20 parts by weight or more of washing water, based on 100 parts by weight of the ester of a fatty acid and washing. However, although the reduction in a glycerol content can be expected, there is a concern that the purity of the methyl ester of a fatty acid is lowered due to hydrolysis caused by the high-temperature treatment (the alkali catalyst is neutralized with an acid, but it is difficult to accurately carry out neutralization because the system contains heterogeneous phases, and whereby a high-temperature treatment is carried out under alkali or acidic conditions). Further, it is still necessary to treat a large amount of wastewater.

As to the refining process which does not involve washing with water, a process for preparing a diesel fuel oil from a waste edible oil has been disclosed (JP-A-Hei-10-245586). As to the refining process, the adsorption and refining process by an activated clay of an alkyl ester of a fatty acid has been disclosed. In the process, wastewater is not generated and the alkali component used for the reaction is adsorbed and removed; however, glycerol, or a monoglyceride, a diglyceride, or the like is less likely to be removed, so that only an alkyl ester of a fatty acid having an unsatisfactory quality to be used for a diesel fuel oil can be obtained.

As a recently disclosed process, there is a technique for achieving minimization of wastes (WO 03/070859). According to this technique, washing with water is carried out while emulsifying with a small amount of water, and the washing water and hydrophilic substances contained in the washing water are absorbed to a water-absorbent polymer, thereby causing demulsification. Thereafter, the polymer gel is separated by filtration. No wastewater is discharged; therefore, wastewater treatment is not necessitated. However, the water-absorbed polymer gel contains glycerol or the like, so that the polymer cannot be reused even if the polymer gel is dried and dehydrated, whereby the polymer gel must be treated as wastes.

As described above, in conventional methods, as the process for refining an alkyl ester of a fatty acid for a diesel fuel oil, no refining methods can achieve zero discharge of process wastes while satisfying the required quality of a diesel fuel oil have yet been found.

The impurities to be reduced that are contained in the alkyl ester of a fatty acid after the reaction and after the phase separation to be subject in the present invention are mainly a by-product glycerol, and further a monoglyceride and a diglyceride, which are amphiphilic reaction intermediates (which have hydrophilic portions). When the reaction mixture of the present invention is obtained by the procedures of the above step (b), the reaction mixture contains substantially no alkali catalyst. The above substance to be reduced is hydrophilic, and the alkyl ester of a fatty acid is hydrophobic. From the viewpoint of the properties of the impurities, it is preferable in the present invention that the refining of the alkyl ester of a fatty acid is carried out in the step (c).

Specifically, the alkyl ester of a fatty acid is hydrophobic, and at the same time basic, from the viewpoint of an acid-base interaction because the alkyl ester has a carbonyl group. On the other hand, glycerol, a monoglyceride, or a diglyceride is hydrophilic, and at the same time acidic, from the viewpoint of acid-base interaction because the alkyl ester has an alcoholic OH group. Therefore, from the viewpoint of hydrophilicity and hydrophobicity and from the viewpoint of acid-base interaction, a basic resin foamed article preferably used in the steps (a) and (b) as the resin foamed article can also serve as a preferred adsorbent for selective adsorption of the impurities. Among them, a melamine resin foamed article is preferable. The foamed article has a high specific surface area in connection with the adsorption of the impurities, so that a hydrophilic glycerol, monoglyceride or diglyceride can be adsorbed and removed very efficiently by passing a crude alkyl ester of a fatty acid through a column packed with the foamed article and contacting the crude alkyl ester of a fatty acid with the foamed article.

The adsorbent containing a resin foamed article can also be reproduced. The crude alkyl ester of a fatty acid is dewatered, and thereafter washed with an alcohol, so that the adsorbed glycerol, monoglyceride, or diglyceride is desorbed from the adsorbent. This is because binding force between the resin foamed article and glycerol is a weak binding based on hydrophilicity and hydrophobicity or an acid-base interaction, which is not at all a binding based on a neutralization reaction but a physical binding. Therefore, if an alcohol, especially methanol, having relatively high hydrophilicity is present in a large amount, almost all of glycerol, monoglyceride, or diglyceride are desorbed from the viewpoint of the relationship of adsorption equilibrium.

Since the methanol containing glycerol, a monoglyceride, or a diglyceride does not adversely affect the reaction, the methanol can be reused for the esterification reaction of free fatty acids and the transesterification reaction between the fat or oil and the alcohol. Since glycerol, a monoglyceride or a diglyceride is a reaction by-product, or a reaction intermediate, these substances are again separated as a by-product and fed to a catalytic reaction step, so that these substances would not be accumulated at all. Thus, wastes are not generated at all from the process of the present invention. In the present invention, when the steps (a) to (c) are carried out, it is especially preferred to further carry out the step (d) of washing the resin foamed article to which the impurities are adsorbed in the step (c) with an alcohol, and then using the alcohol after washing is used for the esterification of the step (a) and/or the transesterification of the step (b) in combination therewith.

According to the process of the present invention in which the step (d) is further carried out in addition to the steps (a) to (c), it is possible to prepare, for example, a methyl ester of a fatty acid for a diesel fuel satisfying the most important quality factor required of a diesel fuel, i.e., a glycerol content of 0.02% by weight or less without providing a wastewater treatment facility.

EXAMPLES

Example 1

A strongly acidic ion exchange resin ("15 DRY" manufactured by ORGANO Corporation, sulfonic acid group form, average particle size: 0.6 to 0.8 mm, dry product) was pulverized, to prepare 20 g of fine strongly acidic catalyst particles having a size of 270 mesh-pass (50 μm or less). The fine catalyst particles were added to 100 mL of methanol to give a dispersion of the fine catalyst particles.

Next, small pieces (5 mm on each side) of a melamine resin foamed article (a kitchen abrasive manufactured by Azuma Kogyo K. K., measured porosity: 99%) were added in an amount equivalent to 20 mL in a dry state to the dispersion, and the mixture was stirred for several hours. Thereafter, the mixture was filtered and dried to give a catalyst-supporting melamine resin foamed article. The filtrate was dried to determine a weight of the solid content. The weight of the catalyst supported to the resin foamed article is obtained from the difference. As a result, the weight of the catalyst was found to be 2.9 g.

A 10 mL cylindrical column was compression-packed with the entire amount of the foamed article. The column was washed with methanol for a sufficient period of time to ready up for a reaction experiment.

Next, the raw material was fed to begin an esterification reaction (reduction in free fatty acids). The esterification reaction was carried out under the following conditions.

(Reaction Conditions) Feeding rate of fat or oil: 20 g/h (waste edible oil containing 1.8% by weight of free fatty acids)

Feeding rate of methanol: 2.6 g/h (13 parts by weight, based on 100 parts by weight of the fat or oil) (stoichiometrically far excessive to the free fatty acids)

Reaction temperature: 60° C.

Reaction pressure: normal pressure (0.1 MPa)

After 5 hours passed from the beginning of the reaction, and the reaction became steady, a formed liquid was sampled, and an oil layer of the sample (the sample being separated into a methanol layer and an oil layer was analyzed by gas chromatography to determine the amount of reduction in free fatty acids.

The amount of the free fatty acids was reduced from 1.8% by weight to 0.1% by weight, and the reaction ratio of 94.4% was obtained.

Subsequently, the reaction mixture obtained was subjected to a transesterification reaction step and a refining step, to give an alkyl ester of a fatty acid satisfying the quality required of a diesel fuel.

Comparative Example 1

An esterification reaction was carried out in the same manner as in Example 1 except that the column packing substance was changed to 10 mL of an acidic ion exchange resin ("15DRY" manufactured by Organo Corporation, sulfonic acid group form, average particle size: 0.6 to 0.8 mm, dry product). In this case also, a pre-treatment of washing with methanol and immersing in methanol for a sufficient period of time was carried out in the same manner as in Example 1.

As a result of the esterification reaction, the amount of free fatty acids was reduced from 1.8% by weight to 1.0% by weight, and the reaction ratio was found to be 44.4%.

Subsequently, the reaction mixture obtained was subjected to a transesterification reaction in the same manner as in Example 1. However, the alkaline catalyst was saponified by the remaining free fatty acids, or the fatty acids were adsorbed to the alkali catalyst so that the alkali catalyst became poisonous, thereby drastically lowering the reaction rate. The alkyl ester of a fatty acid could not be efficiently obtained, so that the evaluation for quality required of a diesel fuel was not carried out.

Example 2

Calcium oxide (CaO) baked at 800° C. was selected as an alkali catalyst. Five grams of CaO was added to 200 g of methanol (acrylic acid oligomer being added as a dispersant). The mixture was pulverized with a beads-mill so as to have an average particle size of from 0.5 to 2 μm, to give a dispersion of the fine alkali catalyst particles.

Next, a column packed with 10 mL of a melamine resin foamed article of which surface was coated with the pulverized product of a strongly acidic ion exchange resin, i.e., fine sulfonated polystyrene particles, similar to that shown in Example 1 was prepared. The internal of the column was immersed in methanol for a sufficient period of time, and the above dispersion of the fine catalyst particles was passed through the column to support, i.e. to adsorb and fix the fine alkali catalyst particles. The amount of the fine catalyst particles supported was found to be 0.32 g according to the difference in the determinations of solid contents of the dispersion before and after its use. The column was sufficiently washed with methanol to ready up for a reaction experiment.

Next, the raw material was fed to the column to begin a transesterification reaction. The esterification reaction was carried out under the following conditions. As the fat or oil, one after the removal of free fatty acids in Example 1 was used.

(Reaction Conditions) Feeding rate of fat or oil: 20 g/h
  Feeding rate of methanol: 2.6 g/h (13 parts by weight, based on 100 parts by weight of the fat or oil)
  Reaction temperature: 60° C.
  Reaction pressure: normal pressure (0.1 MPa)

After 5 hours passed from the beginning of the reaction, and the reaction became steady, a formed liquid was sampled, and a methyl ester layer of a sample (the sample being separated into a methyl ester layer and a glycerol layer) was analyzed by gas chromatography to determine the formation ratio of ester. As a result, the formation ratio of a methyl ester of a fatty acid was 98.2%.

Subsequently, the reaction mixture obtained, that is, a crude methyl esters of a fatty acid, was subjected to a refining step in a conventional manner, to give an alkyl ester of a fatty acid satisfying the quality required of a diesel fuel.

Comparative Example 2

A transesterification reaction was carried out in the same manner as in Example 2 except that the column was packed with 10 mL of a product obtained by pulverizing calcium oxide (CaO) which was previously baked at 800° C. to a size of 2 to 3 mm. The formation ratio of ester was 16.1%. Also, the reaction mixture obtained was subjected to a refining step in the same manner as in Example 2, to give an alkyl ester of a fatty acid. Since the reaction did not progress, the alkyl ester of a fatty acid as a matter of course did not satisfy the quality required of a diesel fuel.

Example 3

A column was packed with a melamine resin foamed article molded into a cylindrical shape, and the crude methyl ester of a fatty acid, which is the one obtained in Example 2, was passed through the column to carry out an experiment of adsorption and removal of glycerol.

The melamine resin foamed article had a volume of 10 mL, and the amount of the crude methyl ester of a fatty acid passed therethrough was 20 g/h. In the determination of gas chromatography, the resulting methyl ester of a fatty acid was found to contain glycerol in an amount of 2,400 ppm (0.24% by weight).

After continuous operation for 5 hours, in the same determination of gas chromatography, the entire amount of the liquid at the outlet of the column was found to contain glycerol in an amount of 40 ppm (0.004% by weight). The resulting methyl ester of a fatty acid satisfied the quality required of a diesel fuel.

After the adsorption experiment, the liquid in the column was forcibly removed, and thereafter 100 g of methanol was passed through the column to wash away and remove glycerol. The concentration of glycerol in the collected methanol was analyzed in the same manner. As a result, the concentration was found to be 0.23% by weight. In other words, it could be seen that almost all the glycerol was desorbed. Therefore, it could be seen that all the collected methanol was reusable, and there was hardly any load on wastewater treatment.

INDUSTRIAL APPLICABILITY

According to the present invention, a process for preparing an alkyl ester of a fatty acid for a high-quality diesel fuel inexpensively can be provided, the process being capable of innovating the process for preparing an alkyl ester of a fatty acid that is an upstream process in oleo-chemical industry. The process can greatly contribute to an even wider use of bio-fuel.

The invention claimed is:

1. A process for preparing an alkyl ester of a fatty acid, comprising the steps of carrying out an esterification reaction between a free fatty acid in a fat or oil and an alcohol; carrying out a transesterification reaction between the fat or oil and an alcohol; and refining an alkyl ester of a fatty acid,
  wherein the esterification reaction is carried out in a corresponding step (a);
  (a) contacting a fat or oil and an alcohol with a resin foamed article modified to be strongly acidic, and carrying out an esterification reaction between a free fatty acid in the fat or oil and the alcohol; and
  wherein the resin foamed article modified to be strongly acidic in the step (a) comprises a cross-linking resin having a sulfonated benzene ring.

2. A process for preparing an alkyl ester of a fatty acid, comprising the steps of carrying out an esterification reaction between a free fatty acid in a fat or oil and an alcohol; carrying out a transesterification reaction between the fat or oil and an alcohol; and refining an alkyl ester of a fatty acid,
  wherein the transesterification reaction is carried out in a corresponding step (b):
  (b) contacting a fat or oil and an alcohol with a resin foamed article to which a catalyst comprising fine alkali particles is supported, and carrying out a transesterification reaction between the fat or oil and the alcohol; and
  wherein the resin foamed article is a melamine resin foamed article and the resin foamed article in the step (b) is obtained by allowing the melamine resin foamed article to support the fine catalyst particles via fine organic acidic particles and/or fine inorganic acidic particles.

3. The process according to claim 2, wherein the fine catalyst particles in the step (b) comprise at least one member selected from the group consisting of hydroxides, oxides, and composite oxides containing an alkaline earth metal and being insoluble in an alcohol; and hydroxides, oxides, composite oxides, and carbonates of an alkali metal fixed to an alcohol-insoluble solid.

4. The process according to claim 1, wherein the esterification reaction of the step (a) is carried out using the alcohol in a ratio of from 10 to 80 parts by weight based on 100 parts by weight of the fat or oil, and the reaction is carried out at a reaction temperature of 50° to 120° C.

5. The process according to claim 1, wherein the resin foamed article is a hydrophilic and basic resin foamed article having continuous pores, wherein the resin formed article has a specific gravity of from 0.005 to 0.2.

6. The process according to claim 2, wherein the fine catalyst particles in the step (b) have an average particle size of from 0.1 to 10 µm, the fine organic acidic particles have an average particle size of from 0.1 to 100 µm, and the fine inorganic acidic particles have an average particle size of from 10 to 100 nm.

7. The process according to claim 1, further comprising a step of (c) contacting a reaction mixture obtained by the transesterification reaction with a resin foamed article, thereby adsorbing and removing impurities, and refining an alkyl ester of a fatty acid, and the step of (d) washing the resin foamed article to which the impurities are adsorbed in the step (c) with an alcohol and using the alcohol after washing, for the esterification reaction in the step (a).

8. The process according to claim 2, further comprising a step of (c) contacting a reaction mixture obtained by the transesterification reaction with a resin foamed article, thereby adsorbing and removing impurities, and refining an alkyl ester of a fatty acid, and the step of (d) washing the resin foamed article to which the impurities are adsorbed in the step (c) with an alcohol and using the alcohol after washing, for the transesterification in the step (b).

9. The process according to claim 2, wherein the transesterification reaction of the step (b) is carried out using the alcohol in a ratio of from 10 to 80 parts by weight based on 100 parts by weight of the fat or oil, and the reaction is carried out at a reaction temperature of 50° to 120° C.

* * * * *